United States Patent [19]

Zwinselman et al.

[11] Patent Number: 5,342,865
[45] Date of Patent: Aug. 30, 1994

[54] SOLVENT SYSTEM

[75] Inventors: Jan J. Zwinselman, Siebnen, Switzerland; John P. Everett, Bühl-Waldmatt; Karin Wanzl-Dacho, Karlsruhe, both of Fed. Rep. of Germany

[73] Assignee: The Dow Chemical Company, Midland, Mich.

[21] Appl. No.: 50,696

[22] Filed: Apr. 20, 1993

[30] Foreign Application Priority Data

Apr. 24, 1992 [GB] United Kingdom ............ 9208955.6

[51] Int. Cl.$^5$ .................... C08K 3/20; C08L 63/00
[52] U.S. Cl. ...................... 523/414; 524/761
[58] Field of Search ................ 523/414; 524/761

[56] References Cited

U.S. PATENT DOCUMENTS

| | | | |
|---|---|---|---|
| 3,679,465 | 7/1972 | Flynn | 528/104 |
| 4,413,015 | 11/1983 | Anderson et al. | 528/104 |

FOREIGN PATENT DOCUMENTS

| | | |
|---|---|---|
| 677466 | 4/1966 | Belgium . |
| 0458502 | 11/1991 | European Pat. Off. . |
| 2545149 | 4/1977 | Fed. Rep. of Germany . |
| 2650408 | 5/1978 | Fed. Rep. of Germany . |
| 133955 | 1/1979 | German Democratic Rep. . |
| 134446 | 2/1979 | German Democratic Rep. . |
| 1226847 | 9/1989 | Japan . |
| 2279776 | 11/1990 | Japan . |
| 257115 | 3/1949 | Switzerland . |

OTHER PUBLICATIONS

Th.J. Burky et al., "Equilibrium studies of water and thiol addition to ketones: substituent and solvent effects for methyl ketones", Journal of the American Chemical Society, vol. 105, No. 4, 23 Feb. 1983, pp. 868–871.

*Primary Examiner*—Melvyn I. Marquis
*Assistant Examiner*—D. Aylward

[57] ABSTRACT

A solvent system contains methoxy acetone, water and, optionally, an oxygen-containing solvent other than methoxy acetone, such as a propylene glycol monoether or diether. The solvent system is a useful solvent for a curing agent for an epoxy resin, a curing catalyst and/or a cure inhibitor. A solution of the curing agent, the curing catalyst and/or the cure inhibitor in the solvent system can be mixed with an epoxy resin, optionally dissolved in a solvent, for producing a one-component epoxy resin composition.

19 Claims, No Drawings

SOLVENT SYSTEM

BACKGROUND OF THE INVENTION

The present invention relates to a solvent system and to the use of the solvent system for dissolving one or more curing agents for epoxy resins and/or one or more curing catalysts and/or one or more cure inhibitors.

It is a well known technique to utilize an organic solvent for reducing the viscosity of liquid epoxy resins or liquid curing agents therefore or to solubilize solid resins and/or curing agents in organic solvents in order to facilitate the handling of the epoxy resins and/or of the curing agents.

U.S. Pat. No. 3,679,465 teaches to produce reinforced, hardenable epoxy compositions by continuously passing a reinforcement material through an epoxy solution system, thereby impregnating the reinforcement material with the epoxy solution system and to subject the impregnated reinforcement material to a heat treatment. The epoxy solution system contains a curable epoxy resin, a curing agent therefore and a low boiling solvent. Various types of conventional curing agents or hardeners as well as accelerators are listed, such as primary and secondary amines, amides, polyamines, polyamides, dicyandiamide, benzoguanamine, imidazole, tetramethyl diamine, etc. As useful low boiling organic solvents are mentioned acetone or methyl ethyl ketone, or a mixture of dimethyl formamide, acetone and water.

It is known that mixtures containing an epoxy resin and certain curing agents therefore, such as dicyandiamide, have an excellent storage stability at 20° C. Therefore, these mixtures are useful for producing so-called "one-component systems" which cure upon heating.

East German patent 134 446 teaches that a major disadvantage of known one-component systems is the low solubility of dicyandiamide in the solvents which are used in these systems. The amount of dicyandiamide required for curing the system is often close to or even above its saturation concentration in the solvent. Precipitation of dicyandiamide from the one-component system at low temperature, such as 0° C., is quite frequent. In order to overcome this disadvantage, the East German patent suggests to produce a one-component system by dissolving an epoxy resin and dicyandiamide in a mixture consisting of a glycol ether and water. Water is used in an amount of from 1 to 30 percent, preferably 5 to 15 percent, by the weight of the glycol ether. Useful glycol ethers are said to be ethyl glycol and/or methyl glycol.

WORLD PATENT INDEX, Abstract No. 79-26180B by Derwent Publications Ltd., which abstracts East German patent 133 955, discloses that a hardener for epoxy resins consists of dicyandiamide dissolved in a solvent mixture of glycol ethers, especially ethyl glycol and/or methyl glycol, containing 1 to 50, preferably 5 to 20 wt.-%, water. It is disclosed that the presence of water doubles the dicyandiamide solubility.

Presently, the monomethyl ether and monoethyl ether of ethylene glycol as well as dimethyl formamide are widely used in the industry for dissolving epoxy hardeners like dicyandiamide.

However, the wide use of ethylene glycol monomethyl ether, ethylene glycol monoethyl ether and dimethyl formamide has raised some concern among environmentalists.

It is known from Swiss patent 257,115 to heat an epoxy resin in the presence of a solvent with dicyandiamide and an aldehyde condensation product containing etherified methylol groups, such as alkyl ethers of methylolmelamine or of methylolureas. It is suggested to dissolve the epoxy resin in an organic solvent, such as 2-methyl-pentanediol-(2,4), toluene, cyclohexanol, etc. and to add the other components. Alternatively, the epoxy resin can be combined with a mixture of dicyandiamide, aldehyde condensation product and solvent. From 2 to 20 percent, preferably from 6 to 10 percent, of dicyandiamide is used for curing, based on the weight of the epoxy resin. The Swiss patent teaches that the amount of the aldehyde condensation product must be high enough to enable a complete absorption of dicyandiamide in the resin solution. Lacquer resin solutions are produced which can be used for applying coats of lacquer on metals. These coats of lacquer have good properties, such as good adherence to metals and high resistance to chemicals.

WORLD PATENT INDEX LATEST, Abstract No. 91-003223 by Derwent Publications Limited, abstracting published Japanese patent application JP-A-2,279,776 discloses an ink composite containing an epoxy resin, a hardening agent and a solvent. Dicyandiamide, imidazole compounds, triazine compounds, urea compounds, aromatic amine compounds and one or more kinds of photo-cationic polymerization catalysts are used as a hardening agent. The compound of formula $R_1—(OR^2)_nOR^3$ and one or more kinds of solvent naphtha are used as a solvent. $R^1$ is hydrogen or $C_{1-8}$-alkyl, $R^2$ is methylene or ethylene, $R^3$ is hydrogen or $—C(O)—R^4$ wherein $R^4$ is $C_{1-8}$-alkyl and n is 1 to 4.

Published German patent applications DE-A-2,545,149 and DE-A-2,650,408 suggest to utilize a mixture of diacetone alcohol and water for dissolving dicyandiamide. It is recommended to dissolve 3 weight parts of dicyandiamide in 65 weight parts of diacetone alcohol and 13.3 weight parts of water. However, trials made by the Applicants have shown that dicyandiamide dissolves very slowly in the suggested mixture of diacetone alcohol and water. Apparently no more than 3 weight parts of dicyandiamide can be dissolved in the suggested solvent mixture. Furthermore, upon addition of an epoxy resin solution described in detail in the Examples further below, the dicyandiamide solution in diacetone alcohol and water turns turbid. The turbidity is an indication that dicyandiamide crystallizes.

Accordingly, one object of the present inventions is to find a new solvent system. Another object of the present invention is to find a solvent system which is useful for dissolving a curing agent for an epoxy resin, for dissolving a curing catalyst or a cure inhibitor or for dissolving a blend thereof.

SUMMARY OF THE INVENTION

It has been found that a mixture containing methoxy acetone, water and, optionally, an oxygen-containing solvent other than methoxy acetone is a very useful solvent for a curing agent, such as a dicyandiamide, or for a curing catalyst, such as an imidazole or for a cure inhibitor, such as boric acid, or for a mixture of two or more of such compounds.

Accordingly, one aspect of the present invention is a solvent system containing methoxy acetone and water. The solvent system optionally also contains an oxygen-containing solvent other than methoxy acetone.

Another aspect of the present invention is the use of the indicated solvent system for dissolving
a) a curing agent for an epoxy resin; and/or
b) a curing catalyst; and/or
c) a cure inhibitor.

Yet another aspect of the present invention is a method of preparing a solution of one or more compounds selected from the group consisting of
a) curing agents for an epoxy resin;
b) curing catalysts; and
c) cure inhibitors. in the indicated solvent system by contacting one or more compounds selected from the group consisting of a), b) and c) with an effective amount of a solvent system containing methoxy acetone and water and, optionally, an oxygen-containing solvent other than methoxy acetone.

Yet another aspect of the present invention is a solution containing the indicated solvent system and one or more compounds selected from
a) curing agents for an epoxy resin;
b) curing catalysts; and
c) cure inhibitors.

Yet another aspect of the present invention is an epoxy resin composition containing the abovedescribed solution of the present invention and an epoxy resin.

DETAILED DESCRIPTION OF THE INVENTION

The solvent system contains methoxy acetone and water. Methoxy acetone, also named 1-methoxy-2propanone, has the chemical formula $H_3C-C(O)-CH_2-OCH_3$. Methoxy acetone has a boiling point of about 114° C. at atmospheric pressure. The boiling point of the solvent system depends on the amount of water and on the amount and kind of any optional compounds present. Generally, the solvent system has a boiling point between 100° and 150° C., preferably between 105° and 140° C. This is very favourable because on one side the boiling point is low enough to allow removal of the boiling system after usage without substantial difficulties and on the other hand the boiling point is high enough that premature evaporation of the solvent system and a resulting quality loss generally is not experienced.

Generally, the solvent system contains from 2 to 30 percent, preferably from 7 to 20 percent, most preferably from 9 to 15 percent water, based on the total weight of the solvent system. Generally, the solubility of an epoxy curing agent, such as dicyandiamide, or of a curing catalyst, such as an imidazole, in the solvent system increases when the water content in the solvent system increases. However, if the water content in the solvent system is too high, the compound dissolved in the solvent system tends to precipitate if the solution of the compound is mixed with an epoxy resin.

The solvent system may additionally contain an oxygen-containing solvent other than methoxy acetone. However, preferably the water, methoxy acetone and, if present, the oxygen-containing solvent other than methoxy acetone together amount to 90 percent or more, more preferably to 95 percent or more, most preferably to 99 percent or more, of the total weight of the solvent system. Most preferably, the solvent system consists essentially of water, methoxy acetone and, optionally, the oxygen-containing solvent other than methoxy acetone. In this case the above indicated ranges of the water content are based on the total weight of methoxy acetone, water and oxygen-containing solvent other than methoxy acetone, if present.

Preferably, the weight ratio between the oxygen-containing solvent (other than methoxy acetone), if present, and methoxy acetone is from 0.1:1 to 2:1, more preferably from 0.3:1 to 1.5:1, most preferably from 0.5:1 to 1:1. Preferably, the weight ratio between the oxygen-containing solvent, if present, and water is from 0.01-30:1, more preferably from 1-20:1, most preferably from 2-6:1.

Useful oxygen-containing solvents generally contain one or more hydroxyl, phenyl, ether or carbonyl functionalities. Preferred oxygen-containing solvents are alcohols, such as saturated open-chain or cyclic alcohols, preferably methanol, ethanol, the propanols, such as n-propanol or isopropanol, the butanols, such as n-butanol or isobutanol, the hexanols, such as n-hexanol or cyclohexanol, the heptanols, octanols, decanols, dodecanols, such as lauryl alcohol, or the octadecanols, such as stearyl alcohol; or unsaturated alcohols, preferably the allyl or furfuryl alcohol. The alcohols preferably have 1 to 8 carbon atoms. Preferred alcohols are glycols, preferably the propylene or butylene glycols, such as propylene glycol, dipropylene glycol, butylene glycol or dibutylene glycol.

Other useful oxygen-containing solvents are substituted or non-substituted phenols, such as phenol or the methyl phenols.

Other useful oxygen-containing solvents are ketones, such as acetone, methyl ethyl ketone, methyl iso-butyl ketone or cyclohexanone.

Other useful oxygen-containing solvents are ethers, preferably propylene glycol monoethers or diethers, most preferably ethers represented by formula I:

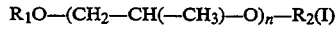

$$R_1O-(CH_2-CH(-CH_3)-O)_n-R_2 \quad (I)$$

wherein
$R_1$ and $R_2$ independently are hydrogen or an alkyl group having from 1 to 12, preferably from 1 to 6, more preferably from 1 to 4 carbon atoms, with the proviso that not both groups $R_1$ and $R_2$ are hydrogen, and n is from 1 to 4, preferably 1, 2 or 3.

The alkyl groups may be branched or unbranched. Exemplary of the alkyl groups are methyl, ethyl, n-propyl, isopropyl, the butyl groups, such as n-butyl or isobutyl, and the pentyl, hexyl, octyl, decyl or dodecyl groups. Of the propyl and butyl groups n-propyl and n-butyl are preferred. Preferably, $R_1$ and $R_2$ independently are hydrogen, methyl or n-butyl.

Preferred monoethers or diethers of formula I are propylene glycol methyl ether, propylene glycol n-butyl ether, propylene glycol dimethyl ether, propylene glycol methyl n-butyl ether, dipropylene glycol methyl ether, dipropylene glycol n-butyl ether, dipropylene glycol dimethyl ether and dipropylene glycol methyl n-butyl ether. The indicated monoethers of formula I are the most preferred oxygen-containing solvents.

Blends of two or more oxygen-containing solvents other than methoxy acetone are are also useful in the solvent system.

As indicated above, the solvent system preferably contains methoxy acetone, water and, optionally, one or more oxygen-containing solvents other than methoxy acetone in the absence of a substantial amount of any other solvent for epoxy curing agents, curing catalysts or cure inhibitors. By the term "in the absence of a substantial amount of any other solvent" is meant that the solvent system contains less that 10 percent, preferably less than 5 percent, more preferably less than 1 percent of any other solvent than methoxy acetone, water or an oxygen-containing solvent, by the total weight of the solvent system.

However, the solvent system may contain other additives, such as viscosity modifiers, for example N-methyl pyrrolidone, thickeners, for example high molecular polyalkylene glycols, or plasticizers, for example dioctyl phthalate or chlorinated paraffin. If present, their amount preferably is from 0.1 to 9 percent, more preferably from 1 to 4 percent, based on the total weight of the solvent system.

The solvent system of the present invention is very useful as a solvent for a) a curing agent for an epoxy resin; and/or b) a curing catalyst; and/or c) a cure inhibitor.

Curing agents for epoxy resins, commonly also called epoxy hardeners, are well known in the art. Useful classes of curing agents are for example amides, polyamides, acid anhydrides, boron trifluoride complexes, dicyandiamide, substituted dicyandiamides, polyester resins, novolacs or phenolic hardeners, i.e. compounds containing more than one aromatic hydroxyl group. Another class of curing agents well known in the art comprises prereacted adducts of epoxy resins with amines or anhydrides or dicyandiamide or phenolic resins. Preferred phenolic hardeners are described on pages 6–8 of European patent specification 0,240,565, the teaching of which is incorporated herein by reference. Other known curing agents are primary or secondary amines, hydrazides or hydrazine, preferably the multifunctional, more preferably the di- to hexafunctional primary amines, amides and hydrazides. Such curing agents are listed on column 5, lines 47–68 and column 6, lines 14–19 of U.S. Pat. No. 4,789,690 the teaching of which is incorporated herein by reference. Further useful curing agents are listed on page 11, lines 41–58 and page 12, lines 1–40 of the published European patent application EP-A-0,458,502, the teaching of which is incorporated herein by reference. Other preferred curing agents are cyanamide, dicyanamide, derivatives of cyanamide or dicyanamide, dihydroxy phenols, biphenols, halogenated bisphenols, alkylated bisphenols, trisphenols, phenolaldehyde resins, halogenated phenol-aldehyde novolac resins, alkylated phenol-aldehyde novolac resins, hydrocarbon-phenol resins, hydrocarbon-halogenated phenol resins, hydrocarbon-alkylated phenol resins or a combination of two or more thereof.

The solvent system of the present invention is particularly useful for dissolving a dicyandiamide, such as a substituted dicyandiamide or non-substituted dicyandiamide (cyanoguanidine). The low solubility of dicyandiamide in other, known solvents or solvent compositions is well known. Therefore, there was a particular need for providing a solvent system in which dicyandiamide can be dissolved to a sufficient extent. It has been found that the solvent system of the present invention is a very good solvent for dicyandiamide. The solvent system of the present invention is also useful for dissolving substituted dicyandiamides, such as dicyandiamides wherein some, but not all, hydrogens bonded to a nitrogen are replaced by alkyl, preferably $C_{1-6}$-alkyl, more preferably methyl, ethyl or the propyl groups; or by aryl, preferably benzyl, more preferably 2-methylbenzyl. Preferably, the dicyandiamide carries only one of the above-listed substituents. Most preferably, the dicyandiamide is not substituted.

The solvent system of the present invention is useful for dissolving one or more of the above-mentioned curing agents for epoxy resins. The term "a curing agent" as used herein also comprises mixtures of two or more compounds which act as a curing agent for an epoxy resin.

If the solvent system is used for dissolving a curing agent, preferably from 1 to 20 percent, more preferably from 2 to 15 percent, most preferably from 3 to 12 percent of a curing agent is dissolved in the solvent system, by the weight of the solvent system. It is to be understood that the solubility of the curing agent in the solvent system of the present invention depends on various factors, such as the type of the curing agent, the specific composition of the solvent system and the amounts and types of compounds which may additionally be dissolved in the solvent system, such as a curing catalyst or a cure inhibitor. The solubility of a specific curing agent in a specific solvent system of the present invention can be evaluated by series trials.

Curing catalysts or curing accelerators which increase the speed of reaction between the curing agent and the epoxy resin are also well known in the art. Preferred are tertiary amine-containing or heterocyclic amine containing compounds. Some curing catalysts may have an effect as a curing agent per se, such as benzoguanamidine, imidazoles, benzodimethylamine, metaphenolene diamine, or N,N,N',N'-tetramethyl-1,3butadiamine. Preferred imidazoles are 2-methyl imidazole, 2-ethyl-4-methyl-imidazole or 2phenylimidazole. 2-Methyl imidazole is the most preferred curing catalyst. Other curing catalysts which may be dissolved in the solvent system of the present invention are heterocyclic nitrogen compounds, phosphines, sulfides or ammonium, phosphonium or sulfonium containing compounds. Such curing catalysts are listed on page 12, lines 41–50, on pages 13–16 and on page 17, lines 1–22 of the published European patent application EP-A-0,458,502. Exemplary of such curing catalysts are ethyltriphenyl phosphonium acetate, ethyltriphenyl phosphonium acetate•acetic acid complex, tetrabutyl phosphonium acetate, tetrabutyl phosphonium acetate•acetic acid complex, ethyltriphenyl phosphonium chloride, ethyl triphenyl phosphonium iodide, tetrabutyl phosphonium chloride, tetrabutyl phosphonium iodide, tetrabutylphosphonium hydroxide, tetramethylammonium hydroxide, ethyltri(2-ethoxyethyl)ammonium hydroxide, triethyl(2-thioethylethyl)ammonium hydroxide, N-methyl-N-methylenemethanaminium acetate, N-methyl-N-methylenemethanaminium acetate,acetic acid complex, N-methyl-N-methylenemethanaminium chloride, N-methyl-N-methylenemethanaminium iodide, N-methylpyridinium acetate, N-methylpyridinium acetate•acetic acid complex, N-methylpyridinium chloride, N-methylpyridinium iodide, 1ethyl2, 3-dimethylimidazolium acetate, 1-ethyl-2,3-dimethylimidazolium acetate•acetic acid complex, 1-ethyl-2,3-dimethylimidazolium chloride, 1-ethyl-2,3-dimethylimidazolium iodide, N-methylquinolinium acetate, N-methylquinolinium acetate•acetic acid complex, N-methylquinolinium chloride, N-methylquinolinium iodide, N-methyl-1,3,5-triazinium acetate, N-methyl-1,3,5-triazinium acetate,acetic acid complex, N-methyl-1,3,5-triazinium chloride, N-methyl-1,3,5-triazinium iodide, ethylamine, diethylamine, triethylamine, n-propylamine, di-n-propylamine, tri-n-propylamine, isopropylamine, diisopropylamine, triisopropylamine, butylamine, dibutylamine, tributylamine, methyldibutylamine or an imidazole, an imidazolidine, an imidazoline, an oxazole, a pyrrole, a thiazole, a pyridine, a pyrazine, a morpholine, a pyridazine, a pyrimidine, a pyrrolidine, a pyrazole, a quinoxaline, a quinoazoline, a phthalozine, a quinoline, a purine, an indazole, an indole, an indolazine, a phenazine, a phenarazine, a phenothiazine, a pyrroline, an indoline, a piperidine, a piperazine; or a combination of two or more thereof.

The solvent system of the present invention is useful for dissolving one or more of the above-mentioned curing catalysts. The term "a curing catalyst" as used herein also comprises mixtures of two or more compounds which increase the speed of reaction between an epoxy resin and an epoxy hardener.

If the solvent system is used for dissolving a curing catalyst, generally from 0.1 to 40 percent, preferably from 0.5 to 35 percent, more preferably from 1 to 20 percent and most preferably from 2 to 12 percent of a curing catalyst is dissolved in the solvent system, by the weight of the solvent system. It is to be understood that the solubility of the curing catalyst in the solvent system of the present invention depends on various factors, such as the type of curing catalyst, the amount and type of curing agent which is optionally present in the solvent system, the specific composition of the solvent system and the amounts and types of compounds which may additionally be dissolved in the solvent system. The solubility of a specific curing catalyst in a specific solvent system of the present invention can be evaluated by series trials. In the case of imidazoles such as 2-methylimidazole, preferably from 1 to 20, more preferably from 2 to 12 percent of an imidazole is dissolved in the solvent system, by the weight of the solvent system.

Useful cure inhibitors are boric acid, metaboric acid, boric acid anhydride or maleic acid or a mixture of (meta)boric acid(anhydride) with at least one acid having a weak nucleophilic anion, such as fluoroboric acid ($HBF_4$). Cure inhibitors are described on page 17, lines 18–58 and page 18, lines 1–38 of the published European patent application EP-A-0,458,502. If a cure inhibitor is dissolved in the solvent system, it is preferably dissolved in the solvent system in an amount of from 0.1 to 12 percent, more preferably from 0.5 to 6 percent, most preferably from 1 to 4%, by the weight of the solvent system.

If the solvent system of the present invention contains substantial amounts of a curing agent, for example between 3 and 12% of dicyandiamide, the solubility of the curing catalyst and/or the cure inhibitor in the solvent system is generally smaller, generally between 0.1 and 3 percent, typically between 0.5 and 2 percent, based on the weight of the solvent system.

As indicated above, one aspect of the present invention is a method of preparing a solution of one or more compounds selected from a) curing agents for an epoxy resin, b) curing catalysts, and c) cure inhibitors, by contacting one or more compounds selected from the group consisting of a), b) and c) with an effective amount of a solvent system containing methoxy acetone and water and, optionally, an oxygen-containing solvent other than methoxy acetone. The solution may be prepared in a known way. Useful curing agents, curing catalysts and cure inhibitors as well as their useful concentrations in the solvent system are indicated above. Generally methoxy acetone, water and, optionally, an oxygen-containing solvent other than methoxy acetone are mixed in the ratios indicated above at a temperature of from 1 to 80° C., preferably from 15° to 40° C., until a homogeneous mixture is obtained. Then the desired amount of curing agent(s) and/or curing catalyst(s) and/or cure inhibitor(s) is added to the solvent system and the resulting mixture is stirred until a clear solution is obtained. The compounds to be dissolved can be added together or alternatingly to the solvent system of the present invention. Alternatively, each compound can be dissolved individually in the solvent system and the resulting solutions can be combined if desired. Preferred compositions of the resulting solutions of the present invention are described above.

The above described solutions of a curing agent and/or a curing catalyst and/or a cure inhibitor in the solvent composition of the present invention can be mixed with an epoxy resin for preparing an epoxy resin composition. Typically the epoxy resin is dissolved in a solvent. Although the solvent for the epoxy resin can be added simultaneously or after the epoxy resin has been mixed with the solution of the curing agent, curing catalyst and/or cure inhibitor, the epoxy resin is preferably pre-mixed with the solvent. The epoxy resin solution is then mixed with the solution of the curing agent, curing catalyst and/or cure inhibitor for producing an epoxy resin composition. Such a resin composition is typically designated in the art as "one-component epoxy resin composition".

The epoxy resin composition of the present invention may contain a wide variety of epoxy resins, provided that they are curable, preferably with dicyandiamide. Curable epoxy resins are well known in the art.

Suitable examples include epoxy resins from the reaction of polyphenols and epihalohydrins, polyalcohols and epihalohydrins, amines and epihalohydrins, sulfur-containing compounds and epihalohydrins, polycarboxylic acids and epihalohydrins, polyisocyanates and 2,3-epoxy-1propanol (glycide) and from epoxidation of olefinically unsaturated compounds. Preferred epoxy resins are the reaction products of polyphenols and epihalohydrins, or polyalcohols and epihalohydrins or of polycarboxylic acids and epihalohydrins. Mixtures of polyphenols, polyalcohols, amines, sulfur-containing compounds, polycarboxylic acids and/or polyisocyanates can also be reacted with epihalohydrins.

Illustrative examples of epoxy resins useful herein are described in The Handbook of Epoxy Resins by H. Lee and K. Neville, published in 1967 by McGraw-Hill, New York, in appendix 4-1, ppgs through 4-56 and U.S. Pat. Nos. 2,633,458; 3,477,990; 3,821,243; 3,970,719; 3,975,397; 4,071,477; and 4,582,892, and GB Patent Specification No. 1,597,610, all of which are incorporated herein by reference.

Epoxy resins of particular interest include diglycidyl ethers of bisphenol compounds, particularly those compounds represented by the following structure I:

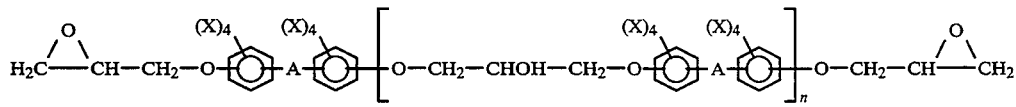

(I)

wherein each A is independently a divalent hydrocarbon group having from 1 to 8 carbon atoms, preferably methylene or, more preferably, isopropylidene (—C(CH$_3$)$_2$—), —C(O)—, —O—, —S—, —S—S—, —S(O)—, —S(O)$_2$—or a covalent bond; each X is independently hydrogen, an alkyl group of 1 to 6 carbon atoms such as methyl, ethyl, propyl, butyl, pentyl or hexyl, or halogen, preferably chlorine or bromine; and n has an average value of from 0 to 35, preferably from 0 to 10, most preferably from 0 to 2.

The average epoxy equivalent weight is advantageously from 149 to 3000, preferably from 170 to 950, most preferably from 170 to 450. The molecular weight is a weight average molecular weight.

Other polyhydric phenols which may be co-reacted with an epihalohydrin to provide these epoxy polyethers are such compounds as resorcinol, hydroquinone and substituted hydroquinones, e.g. methylhydroquinone.

Further useful liquid epoxy resins are those obtained from the reaction of polyhydric alcohols with epihalohydrins. These alcohols can be polyether polyols or polyester polyols.

Another useful class of polymeric resins includes liquid epoxy novolac resins. The epoxy novolac resins can be obtained by reacting, preferably in the presence of a basic catalyst, e.g. sodium or potassium hydroxide, an epihalohydrin, such as epichlorohydrin, with the resinous condensate of an aldehyde, e.g. formaldehyde, and either a monohydric phenol, e.g. phenol itself, or a polyhydric phenol. Further details concerning the nature and preparation of these epoxy novolac resins can be obtained in Lee, H. and Neville, K., Handbook of Epoxy Resins, McGraw Hill Book Co. New York, 1967. The epoxy resin compositions of the present invention may contain two or more different epoxy resin.

Useful solvents for the epoxy resin are well known in the art. Preferred examples are 2-metyl-pentanediol-(2,4), toluene, o-dichlorobenzene, cyclohexanone, cyclohexanol or, more preferably, methyl ethyl ketone or methyl iso-butyl ketone. Mixtures of different solvents are also useful for dissolving the epoxy resin.

Generally, from 50 to 95 percent, preferably from 60 to 90 percent, more preferably from 70 to 85 percent epoxy resin is dissolved in a suitable solvent, based on the total weight of epoxy resin and solvent.

The epoxy resin composition of the present invention preferably contains from 0.5 to 20 percent, more preferably from 1 to 10 percent, most preferably from 2 to 6 percent of a curing agent, such as dicyandiamide, based on the weight of the epoxy resin. The epoxy resin composition preferably also contains from 0.05 to 2 percent, more preferably from 0.08 to 1 percent, most preferably from 0.1 to 0.5 percent of a curing catalyst, such as a 2-methylimidazole, based on the weight of the epoxy resin. The epoxy resin composition may contain a cure inhibitor, such as boric acid, for modifying the curing catalyst. The amount of such a cure inhibitor, if present, preferably is from 0.05 to 2 percent, more preferably from 0.08 to 1 percent, most preferably from 0.1 to 0.5 percent, based on the weight of the epoxy resin. The epoxy resin composition optionally contains known auxiliary compounds, such as colorants, fillers and the like.

The weight ratio between the epoxy resin and methoxy acetone generally is from 0.5–20:1, preferably from 2–15:1, more preferably from 4–10:1. The weight ratio between the epoxy resin and water generally is from 1–60:1, preferably from 5–40:1, more preferably from 10–30:1.

The epoxy resin compositions of the present invention are useful for various known applications, for example for preparing electrical laminates, coatings etc. At least the preferred embodiments of the epoxy resin composition of the present invention are homogeneous and generally have a viscosity that is low enough to allow a good impregnation of a reinforcing material, such as glass rovings, reinforcing mats etc. to produce reinforced epoxy compositions which cure upon heating. Techniques of impregnating reinforcing materials with epoxy resin compositions and curing the epoxy resin compositions are well known in the art.

The present invention is further illustrated by the following examples which should not be construed to limit the scope of the present invention. All parts and percentages are by weight unless otherwise mentioned.

EXAMPLES 1 to 6 AND COMPARATIVE EXAMPLES A TO H

The solubility of dicyandiamide in various solvents is tested. If the solubility of dicyandiamide is found to be at least 8 percent, based on the weight of the solvent system, the dicyandiamide solution is mixed with an epoxy resin solution.

The epoxy resin solution contains 80% of a solid reaction product of a liquid epoxy resin and tetrabromobisphenol A and 20% of methyl ethyl ketone. The epoxy resin solution is commercially available as D.E.R. 537 EK 80 epoxy resin from The Dow Chemical Company.

The dicyandiamide solution and the epoxy resin solution are mixed in such a ratio that the resulting epoxy resin composition contains 4.5% dicyandiamide, based on the weight of epoxy resin solution.

The results are listed in the following Table.

| | Ethylene Glycol Methyl Ether | Propylene Glycol Methyl Ether | Water | Methoxy Acetone | Dipropylene Glycol Monomethyl Ether | Acetone | Solubility of Dicyandiamide in Solvent | Appearance of Epoxy Resin Composition at 0°C. |
|---|---|---|---|---|---|---|---|---|
| Comp. Ex. | | | | | | | | |
| A | 100 | | | | | | <1% | — |
| B | | 100 | | | | | <1% | — |
| C | | | | | | 100 | <1% | — |

| | Ethylene Glycol Methyl Ether | Propylene Glycol Methyl Ether | Water | Methoxy Acetone | Dipropylene Glycol Monomethyl Ether | Acetone | Solubility of Dicyandiamide in Solvent | Appearance of Epoxy Resin Composition at 0°C. |
|---|---|---|---|---|---|---|---|---|
| D | | | 100 | | | | <2% | — |
| E | 100 | | | | | | 10% | Clear |
| F | 85 | | 15 | | | | 10% | Clear |
| G[1)] | | 90 | 10 | | | | <7% | — |
| H[1)] | | 85 | 15 | | | | 10% | Crystallization |
| Ex. | | | | | | | | |
| 1 | | | 5 | 95 | | | <5% | — |
| 2 | | | 15 | 85 | | | 10% | Clear |
| 3 | | | 25 | 75 | | | 10% | Crystallization |
| 4 | | 45 | 15 | 40 | | | 8% | Clear |
| 5 | | | 15 | 50 | 35 | | 8% | Clear |
| 6 | | | 15 | 50 | | 35 | 8% | Clear |

[1)]Not Prior Art

Comparative Examples A, B, C and D illustrate that the solubility of dicyandiamide in undiluted propylene glycol monomethyl ether, undiluted methoxy acetone, undiluted acetone or in water is very low.

Ethylene glycol monomethyl ether is a very good solvent for dicyandiamide and clear epoxy resin compositions can be produced therefrom (comparative example E). The same good results are obtained when ethylene glycol monomethyl ether is mixed with water, as suggested in East German patent 134 446 (comparative example F). However, the wide use of ethylene glycol monomethyl ether might cause environmental problems.

Comparative examples G and H illustrate that the solubility of dicyandiamide in propylene glycol methyl ether can be increased by mixing the propylene glycol methyl ether with water. However, if the water content is only 10 percent (comparative example G), the solubility of dicyandiamide in the solvent mixture is relatively low. If the water content is 15 percent (comparative example H), the solubility of dicyandiamide is higher but it crystallizes when the dicyandiamide solution is mixed with the epoxy resin solution. Comparative Examples F and G are not prior art.

The comparison between examples 1, 2 and 3 illustrates that the solvent system preferably contains from 7 to 20 percent, most preferably about 15 percent water, based on the total weight of the solvent system. Examples 4, 5 and 6 confirm the most preferred water content.

EXAMPLES 7 to 9

In Example 7 a solvent system is prepared consisting of 44% methoxy acetone, 44% methoxy propanol (propylene glycol methyl ether) and 12% water. 6.75% of dicyandiamide is dissolved in the solvent system, by the weight of the solvent system.

In Example 8 a solvent system is prepared consisting of 52.8% methoxy acetone, 35.2% methoxy propanol and 12% water. 7.5% of dicyandiamide is dissolved in the solvent system, by the weight of the solvent system.

In Example 9 a solvent system is prepared consisting of 60.9% methoxy acetone, 27.1% methoxy propanol and 12% water. 10.0% of dicyandiamide is dissolved in the solvent system, by the weight of the solvent system.

The dicyandiamide solution of Examples 7 and 8 provide the best results with respect to homogeneity and processability.

EXAMPLE 10 AND COMPARATIVE EXAMPLE I 3.0 Parts of dicyandiamide, 0.43 parts of 2methyl imidazole and 0.40 parts of boric acid are dissolved in 41.4 parts of a solvent system consisting of 44% methoxy acetone, 44% methoxy propanol and 12% water.

The produced solution is mixed with 125 parts of an epoxy resin solution which is commercially available as D.E.R. 537 EK 80 epoxy resin from The Dow Chemical Company and which is described under Examples 1-6 above. The obtained epoxy resin composition is cured for 2 hours at 170° C. The cured composition provides excellent thermal and chemical resistance properties.

For comparative purposes, an epoxy resin composition is produced by blending 125 parts of D.E.R. 537 EK 80 epoxy resin, 30 parts of a 10% solution of dicyandiamide in dimethyl formamide, 4.3 parts of a 10% solution of 2-methyl-imidazole in methanol and 2.0 parts of a 20% solution of boric acid in methanol (Comparative Example I).

The preparation of the epoxy resin composition of the present invention as illustrated by Example 10 is very favorable because the epoxy hardener and the curing catalysts can all be dissolved in the same solvent blend. It is not necessary to prepare several solvent blends as it is the case in standard preparation methods as exemplified by Comparative Example I.

The epoxy resin compositions of Example 10 and comparative Example 7 prior to and after curing have similar processing properties, for example as measured by gel times, and similar final properties, for example the ability to withstand thermal shock and chemical deterioration after curing.

What is claimed is:

1. A solution comprising
   i) a solvent system comprising methoxy acetone and water, wherein the amount of methoxy acetone is from 40 to 95 percent and the amount of water is from 2 to 30 percent, based on the total weight of the solvent system, and the water, methoxy acetone, and, if present, an oxygen-containing solvent other than methoxy acetone together comprise 90 percent or more by weight of the solvent system and
   ii.) from 3 to 12 percent of dicyandiamide, based on the weight of the solvent system.

2. The solution of claim 1, wherein the solvent system comprises from 7 to 20 percent water, based on the total weight of the solvent system.

3. The solution of claim 1, wherein the solvent system comprises additionally an oxygen-containing organic solvent other than methoxy acetone.

4. The solution of claim 2, wherein the solvent system comprises additionally an oxygen-containing organic solvent other than methoxy acetone.

5. The solution of claim 3, wherein the weight ratio between methoxy acetone and the oxygen-containing organic solvent other than methoxy acetone is from 0.5:1 to 1:1.

6. The solution of claim 4, wherein the weight ratio between methoxy acetone and the oxygen-containing organic solvent other than methoxy acetone is from 0.5:1 to 1:1. containing organic solvent other than methoxy acetone is from 0.1:1 to 2:1.

7. The solution of claim 3, wherein the oxygen-containing solvent other than methoxy acetone is a propylene glycol monoether or diether.

8. The solution of claim 6, wherein the oxygen-containing solvent other than methoxy acetone is a propylene glycol monoether or diether.

9. The solution of claim 1, wherein the water, methoxy acetone, and, if present, the oxygen-containing solvent other than methoxy acetone together comprise 95 percent or more by weight of the solvent system.

10. The solution of claim 8, wherein the water, methoxy acetone, and, if present, the oxygen-containing solvent other than methoxy acetone together comprise 95 percent or more by weight of the solvent system.

11. The solution of claim 1, wherein the solvent system consists essentially of water, methoxy acetone, and, if present, the said oxygen-containing solvent other than methoxy acetone.

12. The solution of claim 10, wherein the solvent system consists essentially of water, methoxy acetone, and, if present, the said oxygen-containing solvent other than methoxy acetone.

13. A method of preparing a solution of dicyandiamide in a solvent system comprising contacting from 3 to 12 percent of dicyandiamide, based on the weight of the solvent system, with a solvent system comprising methoxy acetone and water, wherein the amount of methoxy acetone is from 40 to 95 percent and the amount of water is from 2 to 30 percent, based on the total weight of the solvent system, and the water, methoxy acetone, and, if present, an oxygen-containing solvent other than methoxy acetone together comprise 90 percent or more by weight of the solvent system.

14. The method of claim 13 wherein the solvent system additionally comprises an oxygen-containing organic solvent other than methoxy acetone.

15. The solution of claim 1 comprising additionally one or more compounds selected from the group consisting of curing catalysts and cure inhibitors.

16. The solution of claim 15 wherein the curing catalyst is an imidazole

17. The solution of claim 15 wherein the cure inhibitor is boric acid.

18. An epoxy resin composition comprising
  i.) a solution comprising methoxy acetone and water, wherein the amount of methoxy acetone is from 40 to 95 percent and the amount of water is from 2 to 30 percent, based on the total weight of the solvent system, and the water, methoxy acetone, and, if present, an oxygen-containing solvent other than methoxy acetone together comprise 90 percent or more by weight of the solvent system
  ii) from 3 to 12 percent of dicyandiamide, based on the weight of the solvent system and
  iii) an epoxy resin.

19. The epoxy resin composition of claim 18 wherein the epoxy resin is a diglycidyl ether of a bisphenol compound.

* * * * *